United States Patent [19]
Harris

[11] Patent Number: 5,377,558
[45] Date of Patent: Jan. 3, 1995

[54] PROTECTIVE DEVICE FOR COVERING BRACKETS ON MOTORCYCLE HANDLEBARS

[76] Inventor: Dimitri Harris, P.O. Box 1227, Jonesboro, Ark.

[21] Appl. No.: 54,244

[22] Filed: Apr. 30, 1993

[51] Int. Cl.⁶ .............................................. B62K 21/12
[52] U.S. Cl. ..................................... 74/551.8; 180/84
[58] Field of Search ................... 74/551.8, 551.9, 608, 74/609, 612; 2/17; 180/84

[56] References Cited

U.S. PATENT DOCUMENTS

| | | | |
|---|---|---|---|
| 568,024 | 9/1896 | Gorman | 74/551.8 |
| 609,690 | 8/1898 | Mayerson | 74/551.8 |
| 706,346 | 8/1902 | Schmidt | 74/551.8 |
| 717,662 | 1/1903 | Ellison | 74/551.8 |
| 2,063,493 | 12/1936 | Douglas | 74/551.8 |
| 2,591,523 | 4/1952 | Dick | 74/551.8 |
| 3,336,048 | 8/1967 | Papucki | 74/551.8 |
| 3,462,188 | 8/1969 | Edgar | 74/551.8 |
| 3,832,912 | 9/1974 | Edwards | 74/551.8 |
| 4,141,567 | 2/1979 | Scott | 74/551.8 |
| 4,716,782 | 1/1988 | Jones | 74/551.8 |

FOREIGN PATENT DOCUMENTS

| | | | |
|---|---|---|---|
| 1115529 | 4/1956 | France | 74/551.8 |
| 2668745 | 5/1992 | France | 74/551.8 |
| 60-124577 | 7/1985 | Japan | 180/84 |
| 61-226374 | 10/1986 | Japan | 180/84 |
| 3-109185 | 5/1991 | Japan | 180/84 |

OTHER PUBLICATIONS

Photographs of conventional mud guards from *Dirt Rider* magazine, admitted prior art.

*Primary Examiner*—Vinh T. Luong
*Attorney, Agent, or Firm*—Nixon & Vanderhye

[57] ABSTRACT

A pair of polypropylene protective devices are mounted on the handlebars of an off-road motorcycle to cover metal brackets on the handlebars. Each protective device has a generally U-shaped body with first and second legs connected by a cross member, with the second leg longer than the first leg and a curved transition between the cross member and each of the legs. Preferably two clip members integral with the cross member and extending between the first and second legs are provided, straddling the handlebar bracket. The clip members have a pair of legs with free ends together defining a central opening having an interior configuration and size substantially the same as the exterior configuration of the motorcycle handlebar, and sufficiently flexible so that they can clip onto the handlebar. Fasteners pass through openings in the free ends of the clip legs to hold them in place with a cross member between the handlebar and the motorcycle seat. The kill switch on the handlebar is repositioned to be next to, and uncovered by, one of the protective devices. Two protective devices and a number of fasteners are mounted together in a plastic bag to define a kit.

20 Claims, 3 Drawing Sheets

PROTECTIVE DEVICE FOR COVERING BRACKETS ON MOTORCYCLE HANDLEBARS

BACKGROUND AND SUMMARY OF THE INVENTION

Conventional off-road motorcycles include metal brackets, having protrusions including metal bolt heads, for mounting levers and other operable components on the handlebars of the motorcycle. Of course, it is common in off-road motorcycling for a rider to take a spill, such as by being propelled over the handlebars, or even if not thrown off the motorcycle to impact the handlebars. The metal brackets on the handlebars are a source of severe injury if the rider impacts them.

According to the present invention a simple protective device, and a kit containing two such protective devices, and a method of mounting the devices on the motorcycle handlebars, are provided which solve the problem of severe rider injury from impacting metal brackets on motorcycle handlebars. In a simple and inexpensive way, according to the present invention it is possible to positively protect the rider from such injuries, yet not substantially interfere with the functionality of the levers or other components mounted by the metal brackets.

According to one aspect of the present invention, a protective device for covering motorcycle handlebar brackets is provided. The device comprises the following elements: A generally U-shaped plastic body having first and second legs and a cross-member extending between the legs, a curved transition being provided between the cross-member and each of the legs. And at least one plastic clip member integral with the body and having a pair of cantilevered clip legs extending outwardly from a base integral with the cross-member between the first and second legs, to free ends; the clip member legs defining between them, at a central area between the bases and free ends thereof, a central opening having an interior configuration and size substantially the same as the exterior configuration of a motorcycle handlebar; and the clip member legs having sufficient flexibility to move outwardly when the free ends thereof are brought into contact with a motorcycle handlebar so that the device may be moved to a position with a motorcycle handlebar received within the central opening.

Typically, the second leg is longer than the first leg so as to provide two optional orientations of the protective device depending upon the exact positioning of components on the motorcycle handlebar, to provide maximum utility and versatility of the protective devices according to the invention. Typically, the cross member has a length of about 2–3.5 inches (e.g. 2⅞ inches), the first leg has a length of about ¾ inch to 1 inch (e.g., ⅞ inch), and the second leg has a length of about 1¼ inch to 1⅝ inch (e.g. 1½ inches).

While a wide variety of plastics may be utilized, the preferred plastic is polypropylene since it has sufficient "softness" properties to act as a protective device, yet has sufficient durability and flexibility to withstand the motorcycle environment.

Typically fastener means are provided for connecting the clip legs together adjacent the free ends thereof. The fastener means may comprise the through extending opening provided in each of the clip legs adjacent the free end thereof, a screw threaded fastener, and a nut, the fastener and nut typically of metal.

Typically the at least one clip member consists of two (only) substantially identical clip members, the body having opposite end eddies and one of the clip members adjacent each of the end edges. The protective device is disposed in combination with a motorcycle handlebar having a metal lever bracket, the protective device disposed over the metal lever bracket with the cross member between the seat of the motorcycle and the handlebar, and the clip members straddling the metal lever bracket. The handlebar typically has a kill switch mounted on it, and the kill switch is mounted adjacent a protective device, between the handlebar fork and the protective device and uncovered by the protective device.

For most motorcycles, two protective devices will be utilized, one on each handlebar. That is, one protective device is disposed over each of the metal lever brackets on the motorcycle handlebars with the cross member of each protective device between the seat of the motorcycle and the handlebar, and the flip members of each protective device straddling one of the metal lever brackets.

According to another aspect of the present invention a kit for easy sale, and easy retrofitting of a motorcycle, is provided. The kit comprises: A pair of identical protective devices for covering motorcycle handlebar brackets, each of said protective devices comprising: a generally U-shaped plastic body having first and second legs and a cross-member extending between the legs, a curved transition being provided between the cross-member and each of the legs; and at least one plastic clip member integral with the body and having a pair of cantilevered clip legs extending outwardly from a base integral with the cross-member between the first and second legs, to free ends; the clip member legs defining between them, at a central area between the bases and free ends thereof, a central opening having an interior configuration and size substantially the same as the exterior configuration of a motorcycle handlebar; and the clip member legs having sufficient flexibility to move outwardly when the free ends thereof are brought into contact with a motorcycle handlebar so that the device may be moved to a position with a motorcycle handlebar received within the central opening. A plurality of fasteners for connecting the clip members together adjacent the free ends thereof. And a package for containing the protective devices and fasteners.

Typically, the cress member has end edges, and each of the protective devices first leg is shorter than the second leg and the at least one clip member consists of two identical clip members for each protective device, one adjacent each of the end edges of the cross member. The protective devices are preferably nested within the package so that the first leg of one is adjacent the second leg of the other, with the clip members of one each abutting a clip member of the other. The package typically comprises a plastic bag stapled to a cardboard header, and dimensioned to preclude the protective devices from moving out of nested relationship with each other, so as to minimize package volume. The fasteners typically comprise four screw-threaded bolts and four nuts cooperable with the bolts.

According to yet another aspect of the present invention a method of protecting an off-road motorcycle rider from metal brackets for holding levers or the like on the motorcycle handlebars is provided. The method comprises the following steps: (a) Aligning the clips of each protective device with a handlebar so that a metal bracket is straddled by the clips, and the protective body is between the handlebar and the motorcycle seat. (b) Pushing on the body of each protective device to force the clips to a position in which a handlebar is received by them. And (c) fastening the clips in place so that the protective devices will remain on the handlebars with the protective bodies positively positioned between a handlebar and the seat, and so that the protective devices do not substantially interfere with accessibility and operation of the levers or the like mounted by the metal brackets.

One of the handlebars typically has a kill switch mounted thereon. In that case there are typically the further method steps of: (d) Removing the kill switch from the handlebar prior to step (a) for the handlebar on which the kill switch is mounted. And (e) after step (c), repositioning the kill switch on the handlebar adjacent the protective device associated with that handlebar, so that the kill switch is between the protective device and the motorcycle fork, anti uncovered by the protective device.

Each of the clips comprises a pair of clip arms with free ends and an opening adjacent the free end of each. Step (c) is practiced by passing a screw threaded fastener through the openings in the clip arms of a clip member, and placing a nut in threaded relationship with the fastener to hold it in place, tightly clamping the clip arms to the handlebar.

It is a primary object of the present invention to provide for the effective protection of a rider of an off-road motorcycle from injury by impacting a metal bracket mounting a lever on a handlebar of the motorcycle, while not significantly interfering with the operability or accessibility of the lever. This and other objects of the invention will become clear from an inspection of the detailed description of the invention, and from the appended claims.

DETAILED DESCRIPTION OF THE DRAWINGS

Figure 1:
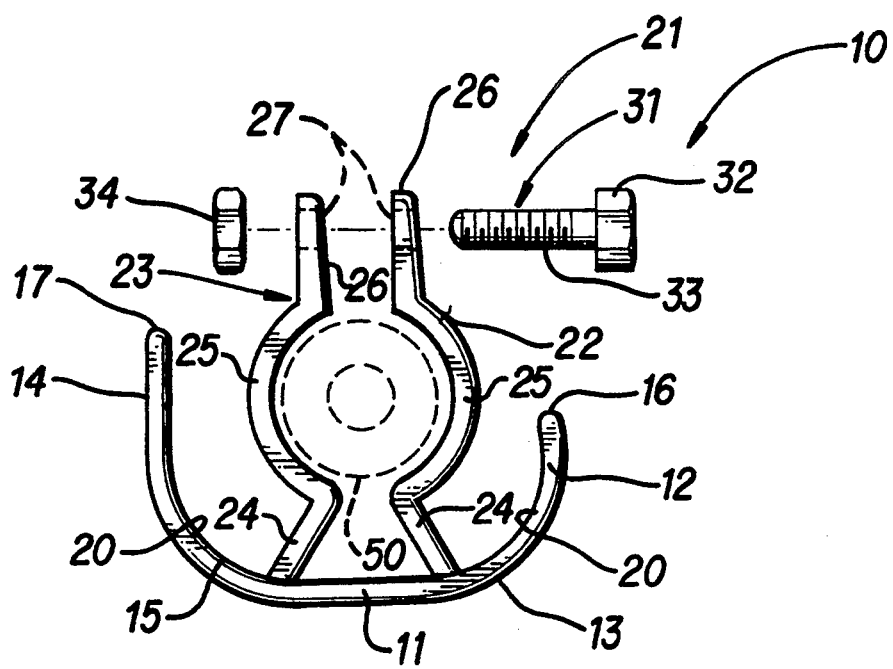
FIG. 1 is a side actual size view of an exemplary protective device according to the invention.
Figure 2:
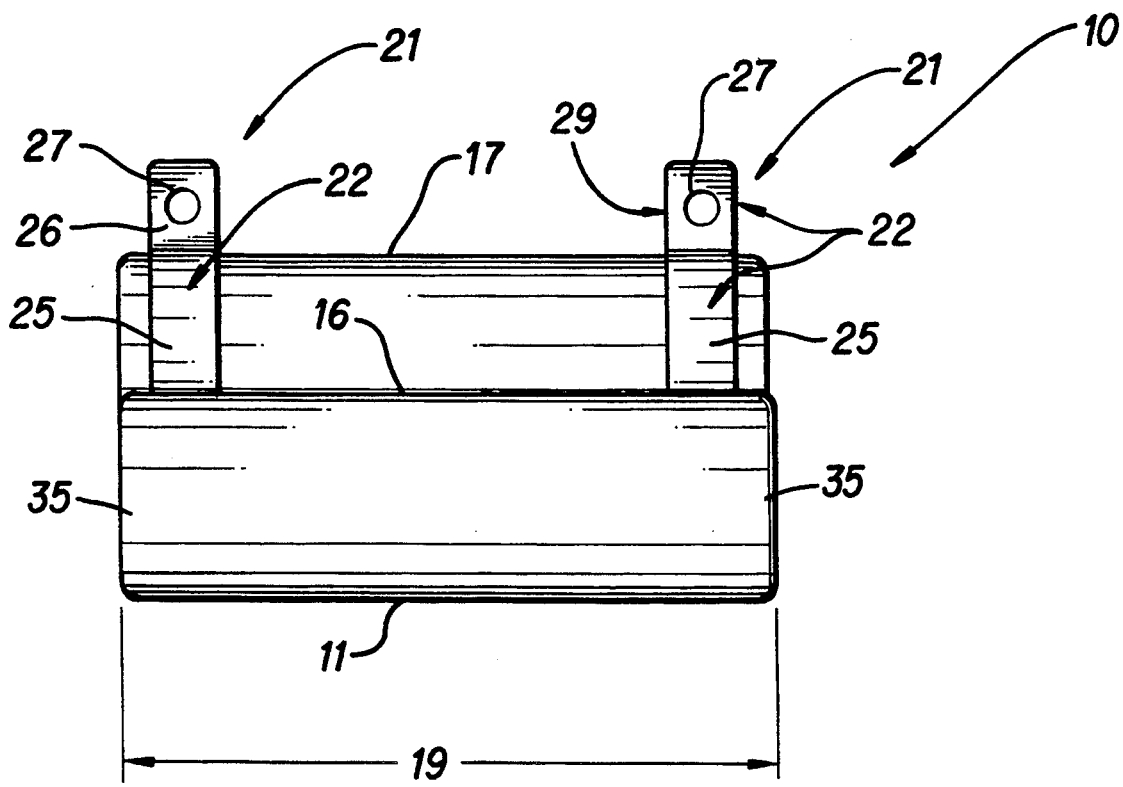
FIG. 2 is a front view of the device of FIG. 1.

An exemplary protective device according to the present invention is shown generally by reference numeral 10 in the drawings. In the preferred embodiment illustrated in FIGS. 1 and 2, the protective device 10 includes a generally U-shaped plastic (typically polypropylene) body having a cross member 11 extending between first and second legs 12, 14, with a curved transition 13, 15 provided between the legs 12, 14, respectively, and the cross member 11. Each of the legs 12, 14 has a free end 16, 17 respectively, and preferably—as illustrated in FIGS. 1 and 2—the lengths of the legs 12, 14 are different. Typically, the length of the first leg 12 (distance between cross member 11 and end 16) is about ¾ inch to about 1 inch (e.g. about ⅞ inch), while the length of the second leg 14 (between cross member 11 and end 17) is about 1¼-1⅝ inch (e.g. 1½ inch). The legs 12, 14 are provided with different lengths so as to make the protective device 10 versatile so that it can be mounted on many different motorcycle handlebars, and can be oriented in two different ways (either the leg 12 on top or the leg 14 on top) depending upon the exact positioning of metal brackets that the protective device 10 is designed to cover.

While the length of the device 10 will depend upon the particular brackets with which it is associated, one desirable length 19 (see FIG. 2) which can accommodate the vast majority of conventional off-road motorcycle handlebars and brackets is about 2–3.5 inches (preferably about 2 15/16 inches). A pair of stress relieving substantially V-shaped grooves 20 (see FIG. 1) may be provided at each of the curved transitions 13, to impart enhanced flexibility to the legs 12, 14. The device 10 can be made by injection molding.

The protective device 10 also includes at least one plastic clip member 21 integral with the body and having a pair of cantilevered clip legs 22, 23 extending outwardly from a base 24 integral with the cross member 11 and between the legs 12, 14. The clip legs 22, 23 are substantially identical, each having a central area (bulge) 25 with an interior configuration and size substantially the same as the exterior configuration of a motorcycle handlebar (50) and adapted to receive the handlebar (50) between them (as illustrated in dotted line in FIG. 1). Each of the clip legs 22, 23 also has a free end 26, typically with a through extending opening 27 adjacent the free end 26 thereof.

The device 10 also preferably comprises fastener means for connecting the clip legs 22, 23 together adjacent the free ends 26 thereof. The fastener means preferably include the openings 27, a bolt 31 having a head 32 and a screw threaded shaft 33, and a nut 34 cooperable with the screw threaded shaft 33 of the bolt 31. The bolt 31 and nut 34 typically are of metal.

As illustrated in FIG. 2, preferably two identical clip members are provided, one of the clip members adjacent each of the end edges 35 of the cross member 11. In this way, the clip members 21 can straddle a metal bracket on a handlebar which is to be covered by the device 10.

Figure 3:
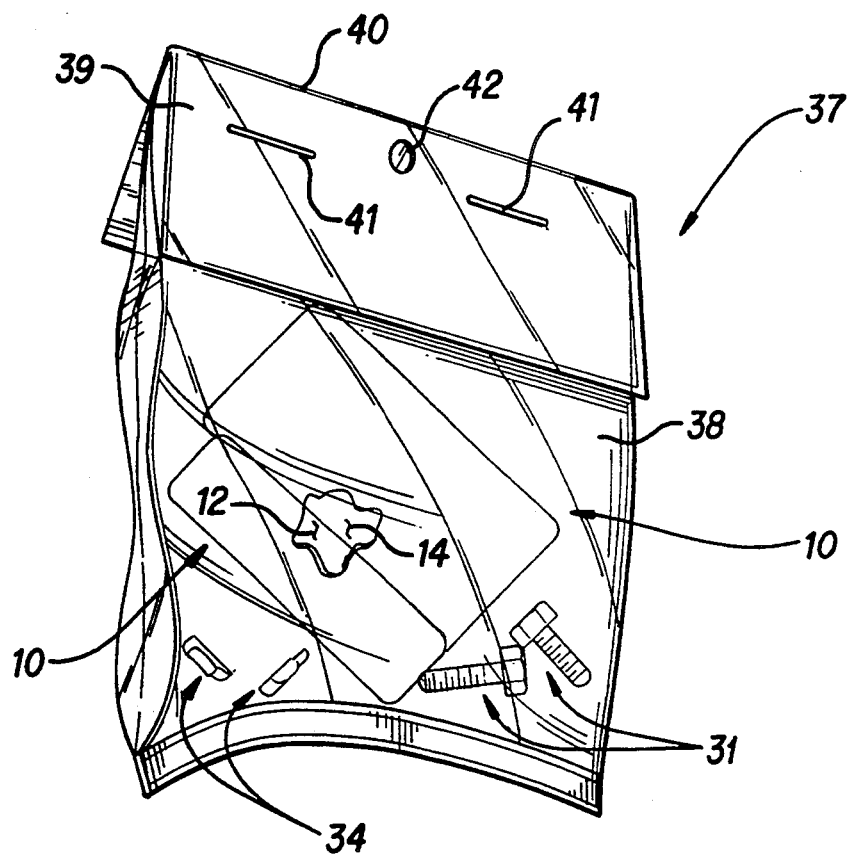
FIG. 3 a perspective view of an exemplary kit according to the present invention, packaging two of the devices of FIGS. 1 and 2 in a nested configuration.

FIG. 3 illustrates a kit 37 according to the present invention which includes a pair of identical protective devices 10. The kit 37 preferably comprises a package for containing two of the devices 10 and the associated fasteners 31, 34. The package includes a plastic bag 38 having a cardboard header 39 folded over at center line 40 thereof to straddle the open top of the plastic bag 38, with staples 41 holding the header card 39 to the bag 38. An opening 42 may be provided in the card 39 to allow mounting it on a hook for display purposes. Note that the plastic bag 38, while large enough to contain two of the protective devices 10, preferably is small enough so that it holds the devices 10 in the nested configuration illustrated in FIG. 3 in which the first (shorter) leg 12 of one device 10 is adjacent the second (longer) leg 14 of the other device 10, with the clip members 21 of one each abutting a clip member 21 of the other. In this nested configuration the kit 37 will assume the minimum volume and will have optimum shippability and displayability. Four bolts 31 and four nuts 34 are provided within the plastic bag 38 along with the two devices 10.

Figure 4:
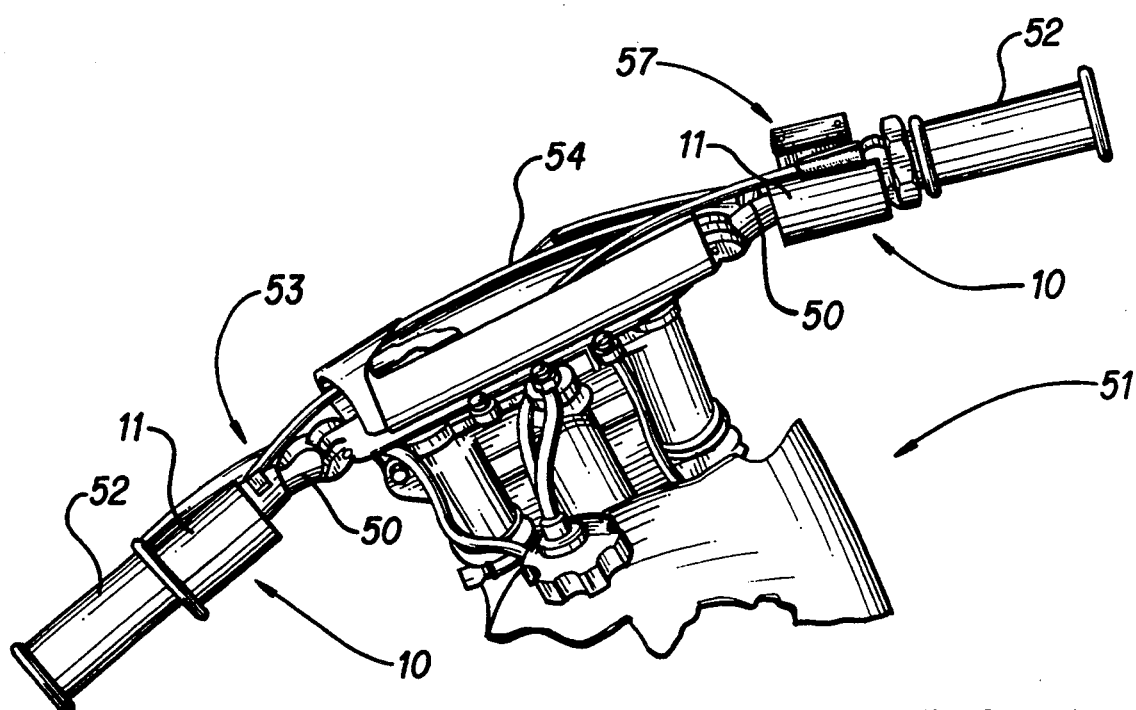
FIG. 4 is a perspective view of the protective devices from FIG. 3 mounted in a preferred manner on the handlebars of a conventional off-road motorcycle.
Figure 5:
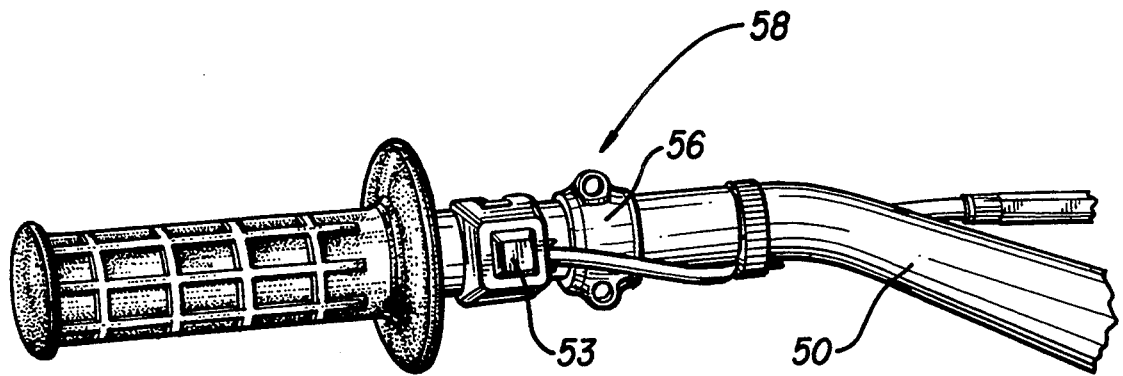
FIGS. 5 and 6 are detailed perspective views of metal lever mounting brackets on the handlebars of the motorcycle of FIG. 4 prior to being covered by the protective devices of FIG. 3.
Figure 6:
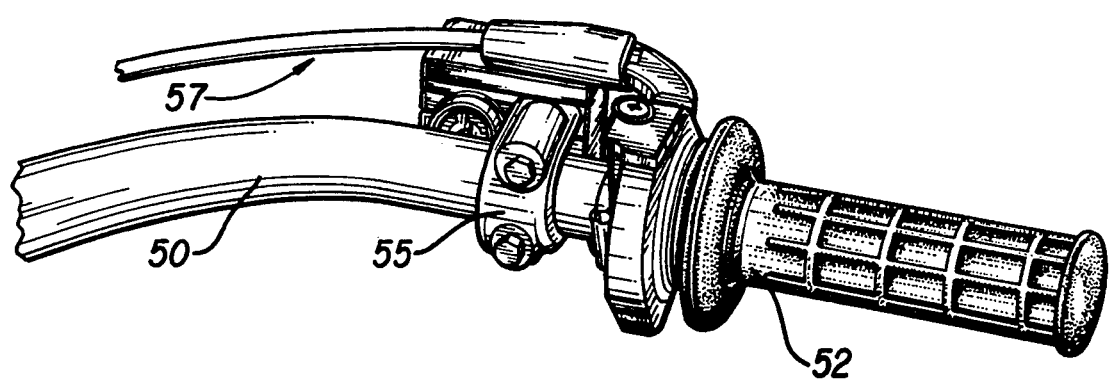

FIG. 4 illustrates the two devices 10 from the kit 37 mounted on the handlebars 50 of a conventional off-road motorcycle 51, while FIGS. 5 and 6 illustrate the left an right hand handlebars, respectively, of the motorcycle 51 prior to mounting the protective devices 10 thereon. As seen in FIG. 4, the devices 10 are mounted adjacent the hand grips 52 of the handlebars 50, between the fork 54 and the hand grips 52, with the cross member 11 disposed between a handlebar 50 and the seat of the motorcycle 51. One of the handlebars 50 (the left hand bar 50 in FIG. 4) includes a kill switch 53, which is mounted so that it is adjacent, yet uncovered by, a protective device 10. In mounting the protective devices 10 as illustrated in FIG. 4, depending upon the exact configuration of the motorcycle 51 components, either the shorter leg 12 or the longer leg 14 may be mounted on top of the handlebar 50.

The devices 10 are mounted on the handlebars 50 by aligning the clip members 21 so that a metal bracket (see the brackets 55, 56 in FIGS. 6 and 5, respectively) for mounting a lever or the like onto the handlebar 50—shown generally by reference numerals 57 and 58 in FIGS. 6 and 5, respectively—is straddled by the clip members 21 of the device 10. The handlebar 50 is positioned between the legs 22, 23 of the clip members 21, and then the cross member 11 is pushed toward the handlebar 50 so that the legs 22, 23 cam outwardly (having sufficient flexibility to do this) until the handlebar 50 is received within the central opening/bulges 25 of the clip arms 22, 23. Then the fasteners 31 are passed through the openings 27 and tightened in place using the nuts 34 so as to positively hold the device 10 in a position in which the cross member 11 will always be between the motorcycle seat and the handlebar 50 to protect the rider, yet the legs 12, 14 will not substantially interfere with accessibility or operability of the levers 57, 58.

Note that in mounting the protective device 10 on the left handlebar 50 (see FIGS. 4 and 5), it may be necessary to reposition the kill switch 53. Normally the kill switch 53 is mounted as illustrated in FIG. 5. To effect repositioning, it is only necessary to remove the kill switch 53 (e.g. by loosening it so that it slides along the handlebar 50 to a position remote from the bracket 56), mount the protective device 10, and then attach the kill switch 53 in place between the protective device 10 and the fork 54, but uncovered by device 10 so that switch 53 is readily accessible to the rider.

It will thus be seen that according to the present invention a device for effectively protecting an off-road motorcycle rider from severe injury due to impacting metal brackets on the motorcycle handlebar is provided, as well as a kit for conveniently packaging and allowing utilization of the protective devices, and a method of protecting an off-road motorcycle rider utilizing two such devices. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent products and procedures.

What is claimed is:

1. A protective device for covering motorcycle handlebar brackets, comprising:
    a generally U-shaped plastic body having first and second legs and a cross-member extending between said legs, a curved transition being provided between said cross-member and each of said legs; and
    at least one plastic clip member integral with said body and having a pair of cantilevered clip legs extending outwardly from a base integral with said cross-member between said first and second legs, to free ends; said clip member legs defining therebetween, at a central area between said base and free ends thereof, a central opening having an interior configuration and size substantially the same as the exterior configuration of a motorcycle handlebar; and said clip member legs having sufficient flexibility to move outwardly when said free ends thereof are brought, into contact with a motorcycle handlebar so that said device may be moved to a position with a motorcycle handlebar received within said central opening; and wherein said first leg is not as long as said second leg.

2. A protective device as recited in claim 1 wherein said cross-member has a length of about 2–3.5 inches, wherein said first leg has a length of about ¾ inch to about 1 inch and said second leg has a length of about 1⅛–1⅜ inch.

3. A protective device as recited in claim 1 wherein said plastic is polypropylene.

4. A protective device as recited in claim 3 further comprising fastener means for connecting said clip legs together adjacent said free ends thereof.

5. A protective device as recited in claim 4 wherein said fastener means comprise a through extending opening provided in each of said clip legs adjacent said free end thereof, a screw threaded fastener, and a nut.

6. A protective device as recited in claim 5 wherein said screw threaded fastener and nut are of metal.

7. A protective device as recited in claim 5 wherein said at least one clip member consists of two substantially identical clip members; said body having opposite end edges, and one of said clip members adjacent each of said end edges.

8. A protective device as recited in claim 3 further comprising fastener means for connecting said clip legs together adjacent said free ends thereof.

9. A protective device as recited in claim 8 wherein said fastener means comprises a through extending opening provided in each of said clip legs adjacent said free end thereof, a screw threaded fastener, and a nut.

10. A protective device as recited in claim 1 wherein said at least one clip member consists of two substantially identical clip members; said body having opposite end edges, and one of said clip members adjacent each of said end edges.

11. A protective device as recited in claim 1 further comprising fastener means for connecting said clip legs together adjacent said free ends thereof.

12. A protective device as recited in claim 11 wherein said fastener means comprises a through extending opening provided in each of said clip legs adjacent said free end thereof, a screw threaded fastener, and a nut.

13. A protective device for covering motorcycle handlebar brackets, comprising:
    a generally U-shaped plastic body having first and second legs and a cross-member extending between said legs, a curved transition being provided between said cross-member and each of said legs;

two substantially identical plastic clip members integral with said body and each having a pair of cantilevered clip legs extending outwardly from a base integral with said cross-member between said first and second legs, to free ends; said clip member legs defining therebetween, at a central area between said base and free ends thereof, a central opening having an interior configuration and size substantially the same as the exterior configuration of a motorcycle handlebar; and said clip member legs having sufficient flexibility to move outwardly when said free ends thereof are brought into contact with a motorcycle handlebar so that said device may be moved to a position with a motorcycle handlebar received within said central opening; and said body having opposite end edges, and one of said clip members adjacent each of said end edges.

14. A protective device as recited in claim 13 wherein said first leg is not as long as said second leg.

15. A protective device as recited in claim 14 in combination with a motorcycle handlebar having a metal lever bracket, said protective device disposed over said metal lever bracket with said cross-member between a seat of a motorcycle connected to said motorcycle handlebar and said handlebar, said clip members straddling said metal lever bracket, and said device not substantially interfacing with accessibility or operability of a lever mounted by said metal lever bracket.

16. A protective device as recited in claim 14 wherein said cross-member has a length of about 2-3.5 inches, wherein said first leg has a length of about ¾ inch to about 1 inch and said second leg has a length of about 1⅛-1⅜ inch.

17. A protective device as recited in claim 14 wherein said plastic is polypropylene.

18. A protective device as recited in claim 13 in combination with a second identical protective device and a motorcycle handlebar having a pair of metal lever brackets, one of said protective devices disposed over each of said metal lever brackets with said cross-member of each protective device between the seat of the motorcycle and the handlebar, said clip members of each protective device straddling one of said metal lever brackets, and each said device not substantially interfering with accessibility or operability of a lever mounted by the metal lever bracket.

19. A protective device for covering a motorcycle handlebar mounted metal lever bracket, in combination with said motorcycle handlebar and metal lever bracket, comprising:

a generally U-shaped plastic body having first and second legs and a cross-member extending between said legs, a curved transition being provided between said cross-member and each of said legs;

at least one plastic clip member integral with said body and having a pair of cantilevered clip legs extending outwardly from a base integral with said cross-member between said first and second legs, to free ends; said clip member legs defining therebetween them, at a central area between said base and free ends thereof, a central opening having an interior configuration and size substantially the same as the exterior configuration of a motorcycle handlebar; and said clip member legs having sufficient flexibility to move outwardly when said free ends thereof are brought, into contact with a motorcycle handlebar so that said device may be moved to a position with a motorcycle handlebar received within said central opening; and said protective device disposed over said metal lever bracket with said cross-member between a seat of a motorcycle connected to said motorcycle handlebar and said handlebar, said clip members straddling said metal lever bracket, and said device not substantially interfering with accessibility or operability of a lever mounted by said metal lever bracket.

20. A protective device and handlebar combination as recited in claim 19 wherein said handlebar includes a handlebar fork, and wherein said handlebar also has a kill switch mounted thereon, and wherein said kill switch is mounted adjacent said protective device, between said handlebar fork and said protective device, and uncovered by said protective device.

* * * * *